(12) United States Patent
Li et al.

(10) Patent No.: US 9,158,117 B2
(45) Date of Patent: Oct. 13, 2015

(54) SPECTRA SHAPING DEVICE FOR CHIRPED PULSE AMPLIFICATION

(76) Inventors: Ming Li, Shanghai (CN); Yaping Dai, Shanghai (CN); Tao Wang, Shanghai (CN); Bin Zhang, Chengdu (CN)

( * ) Notice: Subject to any disclaimer, the term of this patent is extended or adjusted under 35 U.S.C. 154(b) by 632 days.

(21) Appl. No.: 12/735,946

(22) PCT Filed: Mar. 5, 2009

(86) PCT No.: PCT/IB2009/050916
§ 371 (c)(1),
(2), (4) Date: Jun. 2, 2011

(87) PCT Pub. No.: WO2009/133479
PCT Pub. Date: Nov. 5, 2009

(65) Prior Publication Data
US 2013/0128343 A1  May 23, 2013

(30) Foreign Application Priority Data
Feb. 26, 2008 (CN) .......................... 2008 1 0033886

(51) Int. Cl.
G02B 17/00 (2006.01)
G02B 27/09 (2006.01)
G01J 3/18 (2006.01)
(Continued)

(52) U.S. Cl.
CPC ........... G02B 27/0944 (2013.01); G01J 3/1804 (2013.01); G02B 19/0023 (2013.01);
(Continued)

(58) Field of Classification Search
CPC ............. G02B 27/09; G02B 17/0657; G02B 17/0892; H01S 3/005; H01S 3/06754; H01S 3/0057; H01S 3/107; H01S 5/141; G01J 3/02; G01J 3/42; G01J 3/18; G02F 1/0123; G02F 2203/26

USPC ............... 359/239, 264, 333, 337, 365, 366; 356/315, 316, 318, 319, 320, 326, 328, 356/334; 372/9, 20, 25, 26
See application file for complete search history.

(56) References Cited

U.S. PATENT DOCUMENTS 8,520,297 B2 * 8/2013 Li et al. .......................... 359/333

FOREIGN PATENT DOCUMENTS

| CN | 1661416 | * | 8/2005 | ............. G02B 27/09 |
| JP | 2001-289713 | * | 10/2001 | ................. G01J 3/18 |

OTHER PUBLICATIONS

English translation of JP 2001-289713, translated on JST Mar. 20, 2013.*

*Primary Examiner* — Thomas K Pham
*Assistant Examiner* — Jie Lei

(57) ABSTRACT

A spectra shaping apparatus for chirped pulse amplification (CPA) comprises a CTSI spectral decomposition system and a CTSI spectral synthesizing system being symmetrical, and a spectral modulating system composed of a diaphragm (10) and a plane spectra modulating reflector (5), wherein the CTSI spectral decomposition system totally expands a laser chirped pulse to a spectra plane, the spectral modulating system performs a spectra modulation on the image plane, and the CTSI spectral synthesizing system reverts the modulated spectra into the chirped pulse without distortion, thereby realizing spectra shaping. The apparatus has the feature of manufacturing easy, compacting structure, requiring less space, and cheap in cost etc., which can be different types of configuration for different circumstance application, and which can be utilized in a general laser spectrum shaping and spectrum modulation, especially for a high energy and ultra-high peak-power laser system with a large caliber and a broadband of pulse.

10 Claims, 2 Drawing Sheets

(51) Int. Cl.
  *G02B 19/00* (2006.01)
  *G01J 3/24* (2006.01)
  *G01J 3/12* (2006.01)
  *H01S 3/00* (2006.01)

(52) U.S. Cl.
  CPC ........ *G02B19/0052* (2013.01); *G02B 27/0927* (2013.01); *G02B 27/0983* (2013.01); *G01J 3/24* (2013.01); *G01J 2003/1282* (2013.01); *H01S 3/005* (2013.01)

SPECTRA SHAPING DEVICE FOR CHIRPED PULSE AMPLIFICATION

PRIORITY CLAIM

This application claims the priority of CN Provisional Application Ser. No. 200810033886.4, filed on 26 Feb. 2008.

TECHNICAL FIELD OF THE INVENTION

The present invention relates generally to a pulse shaping apparatus for laser amplification in the power. The embodiments of the invention relate in particular to manipulating the spectral and temporal characteristics of laser pulses, which the spectra shaping apparatus is for a large caliber and high power chirped pulse amplification (CPA) in huge energy, which belongs to the filed of application technology of engineering optics.

DISCUSSION OF BACKGROUND ART

In the field of the high-power ultra-short laser pulse amplification, the enhancement of the output of a laser system is hampered by a series of factors such as the gain narrowing effect and the gain saturation effect in the solid-state laser amplification medium. The gain narrowing effect is caused by the limited bandwidth of the atomic emission in the laser medium and the frequency pulling effect, which makes the spectrum of the output pulse narrowing that not only leads to the deformity of the pulse waveform but also conducts the chirped pulse hard to be compressed into the original width. The gain saturation effect is another main factor leading to the distortion of CPA. It is caused by the pulse head depletion more the population inversion in the amplification medium than the pulse tail, which leads to the intensity of the pulse head getting more amplification than the intensity of the pulse tail. Hence the output of amplified pulse becomes asymmetric in the pulse waveform, which leads to the lose of amplification efficiency of chirped pulse, which leads to the red shift effect in the spectrum of the laser pulse, and which leads to the distortion of CPA. In order to compensate the gain narrowing and gain saturation effects in CPA, and also to improve the signal to noise ratio (SNR) of the output high-power laser pulse, people needs a kind of spectrum modulation apparatus to shape the spectrum distribution of pre-amplification pulse making it depression in the vicinity of center wavelength in some shapes and in some depths practically. In the inertial confinement fusion (ICF) field, the physics experiments have harsh requirements on the pulse parameter of the output laser. And lots of attention have been paid to the spatial distribution, the temporal profile, as well as the spectrum shaping in the design of kilojoules peta-watt-class laser system, in order to compensate the gain narrowing and gain saturation effects of CPA, and also to improve the SNR of the output high-power laser pulse, such as in the literatures: [X L Chu, B Zhang, B W Cai, et. al., "Study of the Multipass Amplification of the Chirped Pulse and Its Inverse Problem", Acta Phys. Sin., 2005, 54(10), 4696-1701, B Zhang, B D Li, "An Inverse Problem of Multistage and Multipass Pulsed Laser Amplifiers", Chin. J. Lasers, 1997, 24(6), 495-500, T Wang, D Y Fan, "Pulse Shaping Design of High Power Laser Amplifier", High Power Laser and Particle Beams, 1999, 11(2), 139-142, and X J Huang, X F Wei, H S Peng et. al. "On Structure of a Hundred Terawatt Class Ultra-short Laser System", 2004, the conference of optoelectronics in Sichuan].

The above literatures also illustrate some defects in the traditional shaping apparatus, just as following: 1. Using the thin etalon in regenerative amplification to tune the spectrum of the laser pulse, but it is complexity of the apparatus regulation, in addition, a optical parametric chirped pulse amplifier (OPCPA) has substituted the regenerative amplifier in the front-end of kilojoules peta-watt-class laser system, so this method does not apply. 2. Using the center wavelength blue shift injection, that is, making the centre of the pulse wavelength blue shift relative to the centre wavelength of the medium spontaneous emission, making the long wavelength parts of the pulse with a large duration, and making the spectrum modulation directly, but it is not practical to a over terawatt ($10^{12}$) system. 3. Using the long-wavelength injection method that utilizes narrowing effect to compensate saturation effect, but this will make the system unstable. 4. Using the acousto-optic programmable dispersive filter (AOPDF) to compensate the spectral gain narrowing, but it has lower sufferance of the high power laser damages. Although it is equipped with a strong capability of gain compensation and dispersion compensation, it gets success just on the structure of a hundred terawatt class ultra-short laser system but not for the Nd:glass system in literatures.

At the same time, all the transmitted elements such as the optical filter and the birefringent crystal, and all the organic selection elements such as the hinged organic polymer used for modulating the spectrum of the laser pulse, are unusable for the high-power and huge-energy laser, such as in the literatures [P F Zhu, J X Yang, S L Xue, M R Li, Z Q Lin, "Spectrum Shaping of the Ultrashort Pulse", CHINESE J. OF LASERS, 2003, 30(12), 1075-1078; Y X Leng, L H Lin, Z Z Xu, "Spectrum Shaping in a Ti:Sapphire Regenerative Amplifier", ACTA OPT. SINICA, 2002, 22(02), 170-174]; the CN patent ZL200410025678.1 and the CN patent ZL200410024684.5.

Furthermore, the above literatures also illustrate some defects in the transmission shaping methods, just as following: 1. Using the interference filter for selective transmission, but it exists difficult both in the principle of design and in the fabrication techniques, such as the principle of design can not avoid the Fabry-Perot (FP) side effect. When the modulation bandwidth is less than tens nanometers, the fabrication techniques can not control the bandwidth and the depth in the centre wavelength of the transmittance curve according to the limit of the coating techniques. At the same time, the incident angle of laser is required at high precision and less flexibility. 2. Using the combination lens of birefringent crystal for the selective transmission, here the interference between the ordinary light and the extraordinary light conducts the selective transmission, but it exists difficulty both in the principle of design and in the fabrication techniques. For example, the transmitted element can not avoid the side effect such as FP effect and the distortion of phase etc. Furthermore, the thickness of the birefringent crystal is determined by the spectrum bandwidth of the original pulse, which the law is: the less the bandwidth is, the more the thickness of the birefringent crystal required is. For instance, if the spectrum bandwidth of the ultra-short pulse is 13 nm, the thickness of the birefringent crystal must be 25 mm; however, the size of birefringent crystal can not be produced that large. 3. Using the hinged organic polymer waveguide or using the hinged organic polymer waveguide after a corona poling process for obtaining the characteristics of photoelectric effect for the selective reflection, but it has lower sufferance of the high power laser damages.

SUMMARY OF THE INVENTION

The present invention seeks to provide an improved pulse shaping apparatus to overcome the defects in the traditional shaping devices mentioned above. The new spectra shaping apparatus is proposed based on an improved Czerny-Turner Spectrum Instrument (CTSI) system, which involves two symmetrical CTSI systems, called a spectrum decomposing system and a spectrum synthesizing system respectively, and it involves a spectrum shaping system. The process is as following: firstly, the chirped pulse is spread totally the frequency components of chirped pulse into a spatial place by the spectrum decomposing system. Then, its spectrum is modulated and shaped by the modulation system in the focus plane. And then, the spatial light is integrated un-shiftily by the spectrum synthesizing system back to a designed shape chirped pulse, which accomplishes the spectrum modulating and shaping function. The present invention has solved the problem that the traditional shaping devices in the world are not applicable for a over terawatt ($10^{12}$) system, or are unusable for a Nd:glass system narrow bandwidth system. The present invention can be not only utilized for a general laser spectrum shaping and spectrum modulating, but also especially utilized for a high energy and ultra-high peak-power laser systems with a few nanometers bandwidth and a large caliber in the Nd:glass CPA system. This apparatus has the feature of compacting the structure, requiring less space, and running stability, for its small size of concave reflector, and its self-collimation and its symmetrical distribution. The functional reflector can be manufactured in a large diameter and can be designed on a high damage threshold, so the present invention apparatus can be inserted anywhere in the amplifier chain in the CPA system for extracting large energy and reducing the pedestal of the output. The spectrum modulation ratio can be varied over 60% under the condition that the phase of the reflecting light remains nearly constant. The chromatic resolving capability is about 0.1 nm and the phase aberration in the range of the tens of nanometer is up to 12 mrad, which can meet the requirement of the kilo-joule peta-watt-class reconstruction project.

In order to realize this invention, we have utilized a number of technological measures and steps as following:

The technological design of the spectra shaping apparatus for chirped pulse amplification is: Firstly, the comprising are: counting by the optical path order, a first concave reflector, and, a first aperture, a second concave reflector, a first grating, a third concave reflector and a second aperture, and these constitute a spectrum decomposing system for the spectra shaping apparatus. In addition, a second aperture and a planar reflector for spectrum shaping function design that is at the same place with the second aperture, and these constitute a spectrum shaping system. Furthermore, the planar reflector for spectrum shaping function design, a fourth concave reflector, a second grating, a fifth concave reflector and a third aperture, and these constitute a spectrum synthesizing system for the spectra shaping apparatus. Secondly, the relation is: that the spectrum synthesizing system is optically symmetrical to the spectrum decomposing system; and where the CTSI spectral decomposing system totally expands a laser chirped pulse to a spectrum image plane, the spectral modulating system performs a spectra modulation on the spectrum image plane, and the CTSI spectral synthesizing system reverts the modulated spectra into the chirped pulse, thereby realizing spectra shaping. Thirdly, the processing are: stated in the optical path order, a laser beam from a front-end system of a CPA system passes through the first concave reflector, the first aperture, and the second concave reflector, then it is collimated, dispersed, and imaged by the spectrum decomposing system; then it is shaped by the spectrum shaping system; then it is imaged, the dispersion cancelled, and the spectrum synthesized by the spectrum synthesizing system; after that, it passes through the third aperture ejecting out after finished the spectrum decomposing, the spectrum shaping, and the spectrum synthesizing processes; finally, via a sixth concave reflector, it is transformed into a parallel light again, and it is sent on to the following stage such as the solid-state amplifier to amplification.

The technological design of the spectra shaping apparatus may be: wherein the first grating in the spectrum decomposing system, and the second grating in the spectrum synthesizing system are the reflective planar blazed grating, and at the same time they are symmetrically relative to the planar reflector for spectrum shaping function design; wherein the dispersion cancelling or cancelled the dispersion is when tuning these two gratings the direction of tuning angle should be ensure that: from the inversion optical path, tracing the direction of spectral distribution of different wavelength at the second aperture in the spectrum synthesizing system, it should be the same as the direction of the spectral distribution of the different wavelength at the second aperture in the spectrum decomposing system in the normal optical path tracing.

The technological design of the spectra shaping apparatus may be: wherein the all concave reflector are constructed a symmetrical imaging system relative to the dispersion component, or are constructed a asymmetrical imaging system relative to the dispersion component for compensating the aberration of the image.

The technological design of the spectra shaping apparatus may be: wherein the concave reflectors are made in strictly eliminated the chromatic aberration, the spherical aberration, the comatic aberration, the astigmatism and the field curvature in the whole working frequency bandwidth, to ensure the maximal deviation between the spectrum image plane and the planar reflector for spectrum shaping function design less than the tolerance of the half focal depth.

The technological design of the spectra shaping apparatus may be: wherein the exit pupil of the spectrum decomposing system must coincide with the entrance pupil of the spectrum synthesizing system; or the beam-out from the centre of the first dispersion element or the first grating must pass through the centre of the second dispersion element or the second grating.

The technological design of the spectra shaping apparatus may be: wherein the first aperture, and the third aperture are the aperture diaphragm in the real confocal telescope, which constructed as an illumination system and as an image transfer construction; wherein the illumination system consisted of the first concave reflector, the first aperture and the second concave reflector, or consisted of the sixth concave reflector, the third aperture and the fifth concave reflector, which it ensure that the normal width is suitable for the coherence and phase consisted conditions as a incident light, the distribution of a laser do not changed in the spatial and temporal domain that the laser beam obtained from the front-end system of a CPA system, the relative aperture in the illumination system must matched with the relative apertures in the dispersion system and in the imaging system, and the clear aperture can full of caliber of the dispersion element; wherein the second aperture is a slit diaphragm that composed of a light barrier and its image in the planar reflector for spectrum shaping function design, and all aperture must satisfied the normal width $a_0$ condition for a diaphragm, at the same time the second aperture and the third aperture can pass through the light with all the frequencies within the chirped laser pulse bandwidth.

The technological design of the spectra shaping apparatus may be: wherein the spectrum decomposing system and the spectrum synthesizing system must ensure that, in both system, the focal length of the collimation system and the focal length of the imaging system are equal, and also the lateral magnifications are equal; or the construction of the spectrum decomposing system and the spectrum synthesizing system are absolutely symmetrical, furthermore, tracing in the inversion optical path direction, the focal length of the collimation system and the focal length of the imaging system are equal, and also the lateral magnifications are equal.

The technological design of the spectra shaping apparatus may be: wherein all the concave reflectors in the spectrum decomposing system and all the concave reflectors in the spectrum synthesizing system are constructed as a reflective-type horizontal imaging system relative to the dispersion component for the spectroscope system, or are constructed as a reflective-type vertical imaging system relative to the dispersion component for the spectroscope system.

The technological design of the spectra shaping apparatus may be: wherein the spectrum decomposing system and the spectrum synthesizing system are constructed as a reflective-type horizontal imaging and shaping system relative to the planar reflector for spectrum shaping function design for the spectroscope system, or are constructed as a reflective-type vertical imaging and shaping system relative to the planar reflector for spectrum shaping function design for the spectroscope system.

The technological design of the spectra shaping apparatus may be: wherein the a planar reflector for spectrum shaping function design could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating.

The principle of the present invention of the spectra shaping apparatus is that: for a laser spectrum distribution, the apparatus utilizes a symmetrical CTSI spectral decomposing system to decompose truthfully the chirped pulse spectrum to a spatial space, and utilizes a special modulation system to shape the space distribution on the focal plane, and then utilizes a symmetrical CTSI spectral synthesis system to compose un-shiftily this space distribution to a shaped frequency chirped pulse before incidence into the next amplifier stage, which accomplish the chirped pulse spectrum modulation and shaping goal. In present invention of apparatus, the spectrum shaping apparatus utilizes an improved CTSI spectral decomposing system, utilizes a multilayer dielectric thin film reflector with specific construction to realize the spectrum reshaping of the chirped pulse laser in large energy and high power CPA System, and utilizes an improved CTSI spectral synthesizing system, therefore the apparatus have more tuning flexibility for the spectrum shaping and modulation of chirped pulse in CPA. Furthermore, selecting the reflective planar blazed grating can endure the high power laser damage and can be fabricated in a large caliber, selecting the system structure is not worked exactly on the self-collimation structure for solving the Grating Wood Abnormality; selecting the concave reflectors are suitable for this rational construction in the collimation system and the imaging system, and are made in strictly corrected the spherical aberration and the comatic aberration, to ensure the maximal deviation between the spectrum image plane and the surface of reflector for spectrum shaping function design less than the tolerance of the half focal depth according to the Rayleigh's Criterion; and selecting the rational construction, where it is adjusting the place of the dispersion component relative to the two concave reflectors as objective reflectors, in order to minimize the astigmatism and the comatic aberration. The planar reflector for spectrum shaping function design is featured by a multilayer dielectric thin film as a planar reflector for spectrum shaping with micro-structures in it, which makes the spectrum of chirped pulse a depression in the vicinity of the center but keeps the phase of the reflecting light nearly constant. The details illustrate in the literatures as the CN patent Ser. No. ZL200710049516.5 and the CN patent Ser. No. ZL200720080292.X.

The present invention of apparatus is a spectra shaping device, which all optical components are selected as reflective element. The reason is that: a). the apparatus is for a large caliber and high power chirped pulse amplification in huge energy, only the reflective element is suitable, which can endure the high power laser damage and can be fabricated in a large caliber, b). the chromatic aberration can be eliminated in the reflective element easily, and the additional spectrum shaping has the benefit of free, and the spectrum image planar can be straighten in the grating-style spectrum shaping apparatus; c). the reflective element can be worked on almost all the bandwidth of laser, and be utilized in the infrared and the near infrared laser system, especially there is no suitable optical material for fabrication lens in the far infrared and in the far ultraviolet bandwidth. The present invention of apparatus is a spectra shaping device, which all optical components may be constructed as symmetrically relative to the dispersion element. The reason is that: a). this kind of construction can cancel the cosmetic aberration to zero; b). this construction relative to the dispersion element symmetrical makes compensating the dispersion to zero easily. Furthermore, because of the laser spectrum decomposing and synthesizing, the aperture in the real confocal telescope system substitutes the slit diaphragm in general CTSI system for enhancing light gathering power.

In CPA practice, to compensate the gain narrowing and the gain saturation, to obtain the shortest compressed pulse, and to improve the SNR of output, people needs a kind of spectrum modulation apparatus to shape the spectrum distribution of pre-amplification pulse making it depression in the vicinity of center wavelength in shapes and depths. In the detailed description of the embodiment, the apparatus utilizes a multilayer dielectric thin film reflector with specific construction to realize the spectrum reshaping of the chirped pulse laser in large energy and high power Nd:glass CPA System. If the parameters of the thin film reflector are chosen differently, the results show that the reflectivity distribution of the multilayer dielectric film reflector can be controlled effectively different on the reflectivity curve and on the relative phase, so as to compensate the gain narrowing and the gain saturation effects.

The beneficial effects of the present invention compared with the traditional technological schemes of spectrum shaping are:

1. The present spectrum shaping apparatus utilizes the improved CTSI system and the functional reflector for spectrum shaping design, which decomposes the chirped pulse spectrum, modulates it in the focus plane, then synthesizes the shaped pulse, which has solved the problems that the traditional shaping devices in the world are not applicable to a over terawatt ($10^{12}$) system, or are unusable for a Nd:glass system narrow bandwidth system.

2. The present spectrum shaping apparatus may have the reflective planar blazed grating, which can endure the high power laser damage and can be fabricated in a large caliber, which has solved the problem that the AOPDF to compensate the spectral gain narrowing gets success just on the structure of a hundred terawatt-class ultra-short laser system such as Ti:sapphire system but not on the Nd:glass system.

3. The present spectrum shaping apparatus is selecting the improved CTSI system, selecting the multilayer dielectric thin film as a functional reflector for spectrum shaping design with micro-structures in it, and selecting the method of spectrum decomposing, shaping, and synthesizing for CPA, which has solved the problem that a spectrum shaping device do not suitable for a high energy and ultra-high peak-power laser system with a large caliber and a chirped pulse bandwidth of a few nanometer condition. The present spectrum shaping apparatus is constructed as the symmetrical in optical path, which makes the cosmetic aberration and the astigmatic aberration to minimum scale in the centre of the spectrum image, and cancels the aberration in the boundary of the spectrum image to an idea level. Furthermore, the concave reflector is selected as the collimation objective lens or the spectrographic lens, which the chromatic aberration can be made free, and the spectrum image planar can be straighten in the grating-style spectrum shaping apparatus.

4. The present spectrum shaping apparatus has the benefit that it is not only suitable for Ti:sapphire system but also suitable for the Nd:glass system; has the benefit that the spectrum modulation range can be changed through rotating the reflective planar blazed grating by the axial direction paralleling to the grating groove axis; and has the benefit that it gets a spectrograph easily with an additional focusing free.

5. The present invention of apparatus may have a small size of concave reflector, easy fabrication, compact construction, little laboratory space needed, and cheap in cost, which has solved the problem that the traditional shaping devices in the world are very complex construction required, or are very expensive for advanced system of chirped pulse shaping.

6. The present spectrum shaping apparatus may have the multilayer dielectric thin film as a functional reflector for spectrum shaping design with micro-structures in it, at same time selecting the reflective planar blazed grating, which can endure the high power laser damage and can be fabricated in a large caliber. These measures have solved the problem of the intensity modulation in the reflective large caliber of beam, and which have solved the problem of working under the high pick power condition. So the present invention apparatus can be inserted anywhere in the amplifier chain of the CPA system for extracting large energy and reducing the pedestal of the output.

7. The present spectrum shaping apparatus may have the multilayer dielectric thin film as a functional reflector for spectrum shaping design with micro-structures in it, which has solved the problem that the reflective phase must meet the coherence and the phase consisted condition in the CAP, and which has the benefit that the spectrum modulation ratio can be varied over 60% under the condition that the phase of the reflecting light remains nearly constant.

8. The present spectrum shaping apparatus has the benefit that it can be not only utilized in the ICF spectrum shaping that make the solid-state laser driver ejecting a high-energy in addition to a high peak irradiance, but also can be utilized for a general laser spectrum shaping and spectrum modulation, especially suitable for a high energy and ultra-high peak-power laser system in CPA with a large caliber and a chirped pulse bandwidth of a few nanometers.

9. The present spectrum shaping apparatus has the benefit of selecting the system structure working on the near or non-Littrow mounting for solving the Grating Wood Abnormality, at the same time ensuring the symmetry of the optical construction.

10. The present spectrum shaping apparatus may have the real confocal telescope system, which constructed as an illumination system and as an image transfer construction; which has the benefit that the normal width is suitable for the coherence and the phase consisted conditions; which has solved the problem that the distribution of a laser do not changed in the spatial and temporal domain that the laser beam obtained from the front-end system of a CPA system; which has the benefit that it has a strong light gathering power; and which has the benefit that the relative aperture in the illumination system matches with the relative apertures in the dispersion system and in the imaging system; and which has solved the problem that the clear aperture can fill the caliber of the dispersion element.

Figure 1:
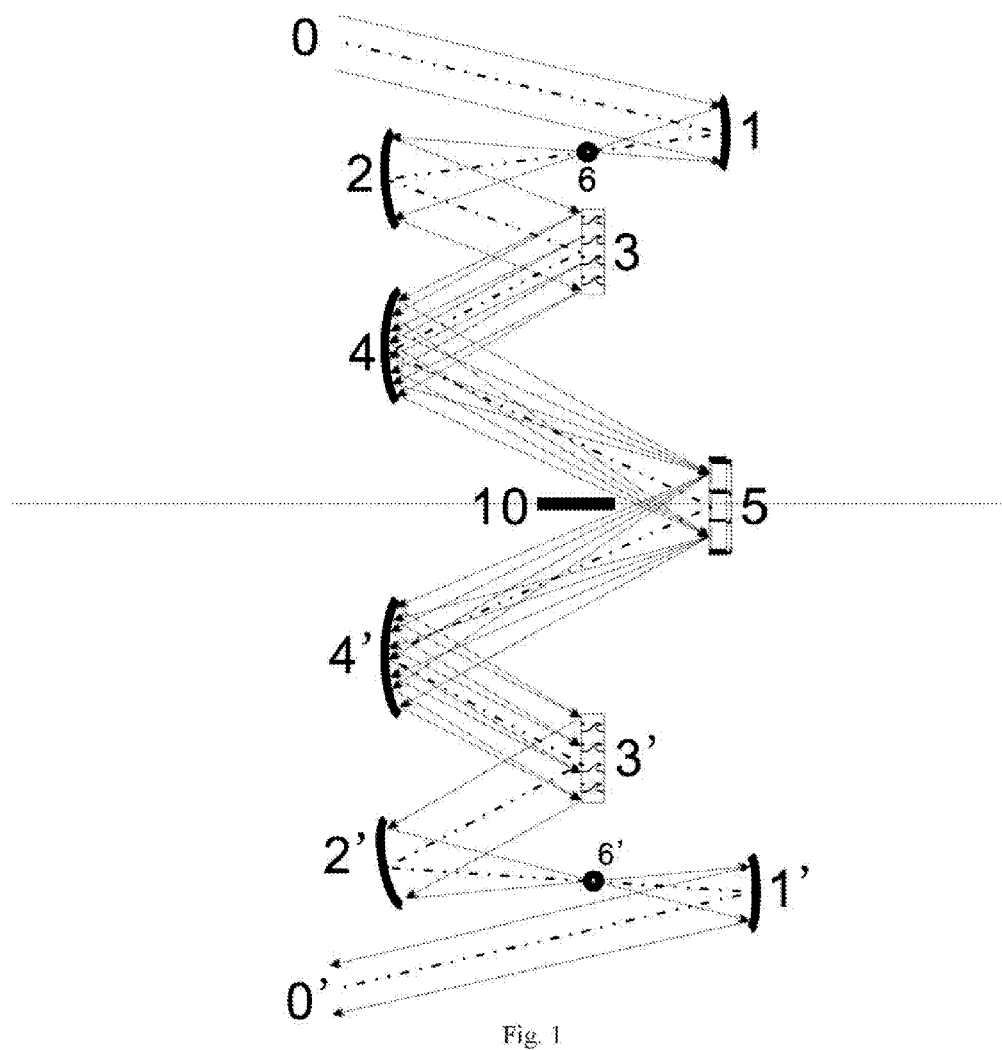
FIG. 1 schematically illustrates the structure of a spectra shaping apparatus embodying the present invention.

In which, 0—the front-end system of CPA; 1—the first concave reflector, 6—the first aperture; 2—the second concave reflector, 3—the first grating; 4—the third concave reflector, 5—the plane reflector for spectrum shaping design; 10—the second aperture; 4'—the fourth concave reflector, 3'—the second grating; 2'—the fifth concave reflector, 6'—the third aperture; 1'—the sixth concave reflector, 0'—the following amplification stage such as the solid-state amplifier.

DETAILED DESCRIPTION OF THE INVENTION

The following will illustrate the present invention through discussing the working principle and the embodiment with the drawings; however, it should be interpreted as an example of the present invention but not as the definition of the scope of protection of the present invention.

The principle of the spectra shaping apparatus of the present invention is:

1. The Spectrum Decomposing System 1.1. The Illumination System

The illumination system is used for gathering the light as more energy as possible from the light source, and for transferring the light to the collimation system. In the present invention, the illumination system is composed of a real confocal telescope system including the first concave reflector 1 and the second concave reflector 2, which ensures that the normal width is suitable for the coherence and the phase consisted conditions, making the distribution of a laser do not changed in the spatial and temporal domain that the seed pulse obtained from the front-end system 0 of a CPA system; which has a strong light gathering power, and which the relative aperture in the illumination system must match with the relative apertures in the dispersion system and in the imaging system, and the clear aperture can fill the caliber of the dispersion element.

1.2. The Collimation System

Because the grating should working on the parallel light in the spectrum decomposing system and in the synthesizing system, the illumination light needs to be changed by a collimation system, which utilizes concave reflectors to fulfill the collimation function. In the optical path order, a light from the incident aperture in the system construction is changed into a parallel light by the concave reflectors, and then it illuminates the grating; called the illumination system. Usually the illumination system is composed of a slot and an objective lens, where the slot is posited in the front focus of the objective lens. However, the aperture in present invention is the aperture diaphragm in the real confocal telescope under the cause of a laser illumination, which replaces the slot in the illumination system, which is the real light source for the following system, and which is the boundary of the beam of an incident light.

1.3. The Dispersion System

The dispersion system is used for decomposing the spectrum of the compound light to a spatial space. However, the spectroscopic prism has a lower dispersive power, and the image of spectrum of the prism has a tilt and distortion inherently, so the spectrum prism is not applicable to the CPA spectrum shaping system. The multiple-beam interferometer such as Fabry-Perot and Lu Mu-mageik parallel plate has a high-resolution of dispersion, but it can not blaze and it can not endure in the high laser energy, and its optical path can not be reversible, so the multiple-beam interferometer is not selected. The concave grating system is simple in construction, but its fabrication can not be easy, its effective area is small, its image can not be clear, its astigmatism is large, and its linear dispersion can not be uniform, so the concave grating is not selected. The spectrum filter is a transmission element, which it has lower sufferance of the high power laser damages, and the transmitted element can not avoid the side effect such as FP effect and the distortion of phrase etc., so the spectrum filter is not selected. The echelon grating has a high-resolution of dispersion, but it can not be fabricated easily, and its free spectral range is very small, so the echelon grating is not selected. Therefore, the reflective planar blazed grating is selected in the present invention, which can endure the high energy and high power laser damage, and which can be fabricated in a large caliber.

1.3.1 The Principle of Spectrum Grating Decomposing

As all the incidence and diffraction light in the principal section of grating, the maximum condition of interference of two adjacent rays defines the grating equation as $$d_1(\sin \alpha_1 + \sin \beta_1) = m_1 \lambda \quad (1)$$

where, $\alpha_1$ is the incident angle relative to the spectrum decomposing grating; $\beta_1$ is the diffraction angle relative to the spectrum decomposing grating; $d_1$ is the grating space relative to the spectrum decomposing grating, called the grating constant; $m_1$ is the order of spectrum relative to the spectrum decomposing grating that is an integer, $\lambda$ is the wavelength. Then Eq. (1) changes to $$\beta_1(\lambda) = \arcsin\left(\frac{m_1 \lambda}{d_1} - \sin\alpha_1\right) \quad (2)$$

Apparently, the Eq. (2) illustrates that when the grating space $d_1$ and the incident angle $\alpha_1$ are given, the diffraction angle $\beta_1$ is larger correspond to the wavelength $\lambda$ longer in the same order of spectrum of the grating $m_1$ level except the zero level. Therefore, the great light of different wavelengths at the same level of the main value appears in the same location of different spaces, which spreads the spectrum by the order from the short wavelength to the long wavelength, from zero level to the larger level of the main value, locating beside the zero level at right and left. Typically, the diffraction angle for a long wavelength is larger than that for a short one, and the distribution of diffractive light is strictly linear, coinciding with the order of wavelength. Because the number of grating grooves is huge, the angular breadth of the great light of diffraction light is mince, which its effect is alike that the fringe is sharper in the fringes pattern. So the pattern of the grating diffraction after the objective lens is a fine and bright line in the focus plane—the spectrum line in practice.

1.3.2 The Principle of Spectrum Grating Synthesizing

Described in the geometrical optics: the great light of different wavelengths at the same level of the main value appears in the same location of different spaces, which the distribution of diffractive light is strictly linear, coinciding with the order of wavelength. Inversely, when the monochromatic light incident in the diffraction angle $\beta(\lambda)$ coinciding with the order of wavelength is converged onto a grating, the grating can combine these monochromatic lights in the order of wavelength to a synthesizing light in the space, which is the result of the multiple-slit diffraction and interference in principle. The great light of the synthesizing light from the grating is determined by the primary maximum conditions for the grating diffraction pattern of all different monochromatic lights. Usually the reflective planar blazed grating is utilized as the spectrum synthesizing element, therefore, as light incident into a main surface, the maximum condition of interference of two adjacent rays defines the grating equation as:

$$d_2(\sin \alpha_2 + \sin \beta_2) = m_2 \lambda = (3)$$

which, $\alpha_2$ is the incident angle relative to the spectrum synthesizing grating; $\beta_2$ is the diffraction angle relative to the spectrum synthesizing grating; $d_2$ is the grating space relative to the spectrum synthesizing grating, called grating constant; $m_2$ is the order of spectrum relative to the spectrum synthesizing grating that is an integer. If the energy loss is neglected, and if all the diffraction lights are a convergent-type spherical wave synthesizing, substituting the Eq. (2) into Eq. (3), that is $\alpha_2(\lambda) = \beta_1(\lambda)$, the grating equation is:

$$d_2\left(\sin\left(\arcsin\left(\frac{m_1\lambda}{d_1} - \sin\alpha_1\right)\right) + \sin\beta_2\right) = m_2\lambda \quad (4)$$

When $d_2 = d_1$, and $m_2 = m_1$, the Eq. (4) changes to $$\sin \beta_2 = \sin \alpha_1 \quad (5)$$

If the principal range is $(0, \pi/2)$, from the Eq. (5), we have $$\beta_2 = \alpha_1 \quad (6)$$

The Eqs. (4), (5) and (6) illustrate that: the grating can combine these monochromatic lights in the order of wavelength to a synthesizing light in the space, when the output angle $\beta_2(\lambda)$ is equal to the incident angle $\alpha_1$ that is in the spectrum decomposing, when a monochromatic light as a convergent-type spherical wave incident in the diffraction angle $$\beta_1(\lambda) = \arcsin\left(\frac{m\lambda}{d} - \sin\alpha_1\right)$$

into the spectrum synthesizing grating, when the grating constants are the same in the spectrum decomposing grating and the spectrum synthesizing grating, which is $d_2=d_1$; when the order of spectrum of grating are the same in the spectrum decomposing and synthesizing, which is $m_2=m_1$; and when the grating blazed, which the principal range is $(0, \pi/2)$. Therefore, the output angle for all the monochromatic lights is equal to a constant, which is the result of the multiple-slit diffraction and interference in principle. In practical, selecting the monochromatic lights in the first level of the grating diffraction pattern that concentrates more than 90% energy for synthesizing, so the great light of the synthesizing light from the grating is bright, and its position is determined by the primary maximum condition for the grating diffraction pattern of all the different monochromatic lights, which is $\beta_2=\alpha_1$. Usually the reflective planar blazed grating is utilized as the spectrum synthesizing element.

The rigorous wave theory has proved the mechanism of the spectrum grating synthesizing, that is: If the position of a spectrum distribution in the spectral plane is $(-f,y_m)$, where $-f$ is the front focus plane of the objective lens where the spectrum distribution before synthesizing is in here; and $y_m$ is the position of the monochromatic light in the spectrum vertical distribution; And, the position of the diffraction grating is $(f,0)$ that is in the back focus; In addition, let the centre-wavelength locates in the optical axis, let the primary maximum of the grating grooves diffraction coincides with the primary maximum of interference of the minus first (−1) level, and let the primary maximum of interference of the zero (0) level coincides with the primary minimum of grating grooves diffraction of the first (+1) level; Furthermore, let the another wavelength locate in the up and down of the optical axis, let the primary maximum of interference of the minus first (−1) level of other wavelength coincides with the primary maximum of grating grooves diffraction of the centre-wavelength; And let the angle between the normal line n of the grating plane and the optical axis of the objective lens be a half of the angle of Groove Mode t, where d is about 1 μm; Therefore, the diffraction output of the compound light obtains the characteristics that the beams overlap each other in the near-field and the far-field well, the half-angular width of the output beam is mince, the intensity of the output is strong, the diffraction efficiency is large, and the energy utilization of the incident light is more effective; Further more, using this kind of spectrum grating synthesizing, the beam quality can reach the nearly diffraction limited quality, where the law is that the smaller the angle of groove mode t is, the smaller the half-angular width of the output beam is.

1.4 The Image System

The image system is used for converging the spread diffraction lights in the order of wavelength onto the focus plane of the objective lens, forming an array of monochromatic image in the order of wavelength spectrum. There are three kinds of spectrum patterns for different research objects: the line spectrum, the band spectrum, and the continuous spectrum. As for chirped pulse decomposing, shaping, and synthesizing, the spectrum pattern in the chirped pulse bandwidth is a continuous spectrum or the first level band spectrum.

In addition, the image system is used for compensating the comatic aberration and the astigmatism correction. The spherical aberration in the image system can not be cancelled by adjusting the element position, but it must be corrected to less than the tolerance of the image and collimation system aberrations in the fabrication and design stage. When the concave reflector is used just as a collimation lens and an objective lens, selecting the paraboloid reflector can cancel the spherical aberration. However, the comatic aberration can be cancelled by adjusting the collimation lens' and the objective lens' position, and designing a special construction to correct. In the present invention, adjusting the relative position between the dispersion element and two concave reflectors as the objective lens eliminates the comatic aberration. In addition, the astigmatism in the image system can not be cancelled by selecting an appropriate geometrical parameter of the concave reflector in the fabrication when the concave reflector is used as a collimation lens and an objective lens. However, the astigmatism can be cancelled by adjusting the relative position of the dispersion element and the two objective reflectors, and designing a special construction to correct.

2. The Spectrum Shaping System

Figure 2:
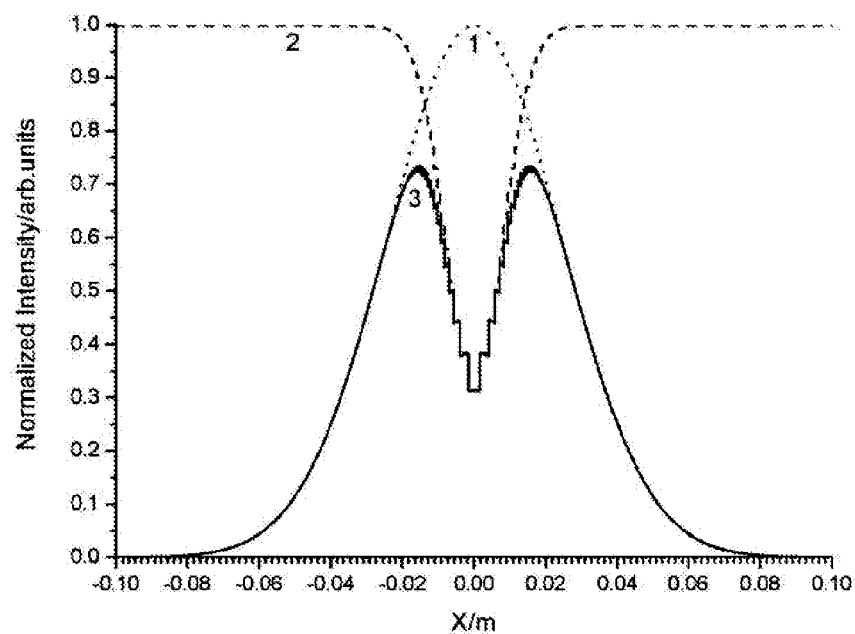
FIG. 2 is a graph schematically illustrating the distribution of spectrum after modulation by the functional reflector for spectrum shaping design.

The spectrum shaping system is composed of an aperture and a planar reflector for spectrum shaping function design, where the chirped pulse passes through the image system projecting onto this functional reflector. The planar reflector for spectrum shaping function design is a microstructure on a multilayer dielectric thin film as a functional reflector to shape the space distribution, where the outer part of the pagoda-step microstructure is the high reflective thin film system and the pagoda-step microstructure is the antireflective thin film system. The high reflective thin film system accomplishes the diffraction intensity modulation as chirped pulse passing grating system, while the antireflective coating microstructure increases the flexibility of the spectrum modulation. With the pagoda-step of the microstructure, a different step level of the mirror corresponds to the horizontal location of the spectra modulating, where all reflected light has a same phase. The planar reflector for spectrum shaping function design 5 makes the spectrum of chirped pulse a depression in the vicinity of the spectrum magnitude in the center wavelength spectrum but remaining the phase of the reflecting light nearly constant. Therefore, the intensity on the surface of the functional reflector is the shaped spectra. The FIG. 2 illustrates that: this planar reflector for spectrum shaping function design can make a depression in the vicinity of the center to shape the reflective intensity into a designed spectrum distribution, where curve 1 is the incident chirped pulse spectra, curve 2 is the modulation curve of a multilayer dielectric reflector determined by the microstructure, and curve 3 is the distribution of chirped pulse spectrum after modulation. Therefore, a suitable pre-amplification pulse, which meets the requirement of the spectrum shaping of a high energy and high power CPA system, can be accomplished by designing the microstructure and controlling the processing accuracy rationally.

3. The Spectrum Synthesizing System

According the principle of spectrum grating synthesizing: the great light of different wavelengths at the same level of the main value appears in a monochromatic distribution of diffractive light linearly, when the monochromatic lights incident in the diffraction angle $\beta/(\Delta)$ converging onto a grating, the grating can combine these monochromatic lights in the order of wavelength to a synthesized light in the space. Described in the inversion optical path order, a light from the spectrum shaping function reflector 5 as a incident light of the spectrum synthesizing system after paralleled by a collimation reflector such as the forth concave reflector 4' is projected onto a second grating 3', where it is accomplished the imaging, the dispersion cancelling, and the synthesizing; finally it is imaged onto a output aperture such as the third aperture 6' ejecting out by the fifth concave image reflector 2'. At this point, all these above constitute the whole spectrum synthesizing unit, called the spectrum synthesizing system with CTSI construction.

The spectrum synthesizing system is composed of a symmetrical dispersion system and a symmetrical image system after the spectrum shaping function reflector 5, in which the features are that: the spectrum synthesizing system images symmetrically to the spectrum decomposing system, cancels dispersion unanimously to the spectrum decomposing system, and subtracts the optical path difference of the different monochromatic lights to zero, making the extra residual dispersion be zero practically. Therefore, we must design the spectrum decomposing system with the CTSI construction and the spectrum synthesizing system with the CTSI construction exactly the same and symmetrical, in which the focal length of the collimation system and the focal length of the imaging system are equal, and also the lateral magnification are equal; or in which the construction of the spectrum decomposing system and the spectrum synthesizing system are absolutely symmetrical; furthermore, in which tracing in the inversion optical path direction, the focal length of a collimation system and the focal length of a imaging system are equal, and also the lateral magnification are equal. Hence, the extra residual dispersion can be made to zero practically under the condition that the widths of all apertures and their images are equal.

4. The Principle of the Aperture Design

According the criterion that the diameter of the disc of confusion in the focus plane is defined as 2dr' that is caused by the spherical aberration and the comatic aberration, and the width of the disc of confusion in the direction of the dispersion is defined as a'. the diameter 2dr' or the width a' must be less than a certain value $a_0$, which called the criteria value of aperture; so the size of the incident aperture is defined by the normal width or the half-width of dispersion as following:

$$a_0 = \lambda \frac{f'}{D} = a_1 \quad (7)$$

$$2dr' \text{ or } a' \leq a_0 \quad (8)$$

In order to let all the output light of the spectrum decomposing system with CTSI construction passes through the spectrum synthesizing system with CTSI construction, wherein the exit pupil of the spectrum decomposing system must coincide with the entrance pupil of the spectrum synthesizing system; or the beam-out from the centre of the first dispersion element or the first dispersion component such as the first grating 3 must pass through the centre of the second dispersion component such as the second grating 3'.

In addition, the apertures at the middle position such as the second aperture 10 and at the output position such as the third aperture 6' should not limit the laser beam, that is to say, all the frequency components within the chirped pulse bandwidth should pass though the system. At the same time, the spectrum decomposing system with CTSI construction and the spectrum synthesizing system with CTSI construction must be constructed as dispersion cancelling mode, and making the spectrum shaping system cancel all the residual dispersion. And the width of the spectrum line is determined by the widths of the apertures at the incident position and at the middle position. So the widths of the apertures at the middle position and at the output position should satisfy that $$a_2 \geq \gamma a_1 + b_1 \quad (9)$$

$$a_3 \geq \gamma^2 a_1 + b_2 \quad (10)$$

Where, $a_1$, $a_2$ and $a_3$ are the widths of the apertures at the incident, middle, and output positions, respectively; $b_1$, $b_2$ are the widths of the image aberrations at the middle and the output apertures, which the images are those the incident aperture $a_1$ imaged onto the middle and the output apertures $a_2$, $a_3$ respectively.

5. The Tolerance of the Imaging and Collimation System Aberrations

Before assembling the spectrum shaping system, the spectrum decomposing system with CTSI construction and the spectrum synthesizing system with CTSI construction must firstly correct the aberration respectively, which ensures that the total aberration must be within the tolerance of engineering aberration design. The requirement of the aberration correction can be summarized by: 1. making the spectrum image plane straight in the whole visual field; 2. making the spectrum clear and symmetrical in the whole spectrum image plane; 3. making the intensity distribution of the spectrum uniform along the vertical direction. Furthermore, because the collimation system of the spectrum decomposing system with CTSI construction and the spectrum synthesizing system with CTSI construction is characterized by a small relative aperture and a small visual field, the imaging system of this system is also a small relative aperture and a middle visual field system.

In addition, the requirement for the parameter of aberration correction can be summarized as that all the objective reflectors of the collimation system and the imaging system are made with strictly correcting the spherical aberration and the comatic aberration. Empirically, we select the Rayleigh's Criterion as the tolerance of the imaging and collimation system's aberrations, where the Rayleigh's Criterion is that the maximum wave aberration of the residual spherical aberration and the residual comatic aberration must be less than $\lambda/4$. According to the relation between the wave aberration and the axial aberration, the tolerances of the spherical aberration and the comatic aberration of the concave reflectors are:

the axial spherical aberration:

$$LA' \leq \frac{8}{3}\lambda\left(\frac{f'}{D}\right) \quad (11)$$

the deflection sine condition $$OSC' \leq \frac{\lambda}{nl}\left(\frac{f'}{D}\right) \quad (12)$$

where, D is the diameter of the effective aperture, which is the effective size of the dispersion element in the spectrum decomposing system with CTSI construction and the spectrum synthesizing system with CTSI construction; f' is the focal length of the objective lens; $\lambda$ is the wavelength of a certain light; l is the distance from the principal ray in the boundary or the spectrum line in the boundary to the optical axis.

At the present invention, selecting the concave reflector as the collimation objective lens and as the imaging objective lens in all structure, the spherical aberration can not be cancelled by adjusting the elements position. And when the spherical aberration needs to be corrected especially, the concave reflector can be substituted by an aspherical reflector. However, because the primary comatic aberration of the parabolic reflector is larger than that of the spherical reflector, the spherical reflector is used universally. Therefore, if the system must adopt the spherical reflector, the size of the relative aperture must be controlled to make the diameter of the disc of confusion of the spherical aberration less than the tolerance of the normal width $a_0$. While the comatic aberration can be cancelled by adjusting the relative positions of the two objective reflector. The present invention corrects the comatic aberration to near zero by designing an improved CTSI special construction and controlling the size of the relative aperture.

Straightening the spectrum image plane: the maximal deviation between the spectrum image plane and the planar reflector for spectrum shaping function design must be less than the tolerance of the half-focal depth, which is $$\frac{1}{2}\Delta F \leq 2\lambda \left(\frac{f'}{D}\right)^2 \quad (13)$$

Where, $\Delta F$ is the focal depth. Usually the bending of the spectrum image plane is dominated by the chromatic aberration of the collimation system and the imaging system, and straightening the spectrum image plane is resulted from the compensation between the chromatic aberration and the field curvature in the meridian plane of the collimation and the imaging objective reflectors. However, in present invention, because the lateral magnification of the grating changes slightly with the wavelength difference, so the method mention above can not be adopted. Therefore, all the objective lenses should be made with strictly eliminating the chromatic aberration, hence selecting the concave reflector as the collimation and imaging objective lens in the present invention.

Astigmatism cancelling: because all the collimation objective lenses and the imaging lenses are concave reflectors, we can not cancel the astigmatism by selecting a rational geometrical parameter of the objective reflector. In present invention, controlling the size of the relative aperture and improving the CTSI system construction are adopted to cancel the astigmatism.

6. The Configuration of the Apparatus

All the concave reflectors, the dispersion components, and the aperture in the spectrum decomposing system and those in the spectrum synthesizing system, and all their images are in a horizontal planar, called constructed as a reflective-type horizontal imaging construction for the spectroscope system. However, all the concave reflectors, the dispersion components, and the aperture in the spectrum decomposing system and those in the spectrum synthesizing system, and all their images are in a vertical planar, called constructed as a reflective-type vertical imaging construction for the spectroscope system. Furthermore, the spectrum synthesizing system is horizontally symmetrical to the spectrum decomposing system relative to the dispersion component, defined as a reflective-type horizontal imaging spectrum shaping system. However, the spectrum synthesizing system is vertically symmetrical to the spectrum decomposing system relative to the dispersion component, defined as a reflective-type vertical imaging spectrum shaping system. Because the functional reflector for spectrum shaping design could make a parasitic diffraction in the horizontal direction, but it is just a planar reflector in the vertical direction, so we select the construction as a reflective-type vertical imaging construction for the spectroscope system in present invention. However, when the width of step of the microstructure in the functional reflector for spectrum shaping design is tens times the wavelength, the parasitic diffraction in the horizontal direction of the functional reflector for spectrum shaping design is too little to be observed. At this time the construction as a reflective-type horizontal imaging spectrum shaping system can be utilized. The circumstance, where the apparatus settled and which the imaging quality of the physical experiments required, dominates what construction can be selected.

DETAILED DESCRIPTION OF THE EMBODIMENT

Example 1 of the Apparatus

In this example 1, there are those: the 3 and the 3' are the reflective planar blazed gratings, which can endure high power laser damage and can be fabricated in a large caliber. The 5 is a multilayer dielectric thin film with micro-structures in it. The 1, the 2, the 4, the 4', the 2', and the 1' are concave reflectors, which are made with strictly eliminating the chromatic aberration, the spherical aberration, and the comatic aberration, to ensure the maximal deviation between the spectrum image plane and the planar reflector for spectrum shaping function design less than the tolerance of the half focal depth deduced from the Rayleigh's Criterion. The 6 and the 6' are the aperture diaphragm. And the 10 is a slit diaphragm that is composed of a light barrier and its image in the planar reflector for spectrum shaping function design 5. The 0 is the front-end system of CPA and the 0' is the following amplification stage such as the solid-state amplifier. The 6 is the incident aperture, the 10 is the middle aperture, and the 6' is the output aperture. The parameters of the design requirement, and the optical element is shown in table 1, which are:

TABLE 1 the parameters of the design requirement and the optical element

| Item | Parameters |
|---|---|
| Diameter of the incidence | Ø3 mm |
| Normal width | 105.3 µm |
| Resolution of line dispersion | 0.1 nm/mm |
| Distance between the collimation lens and the imaging lens | 3000 mm |
| Value of relative aperture | 1:100 |
| Distance between the first grating or the second grating and the collimation lens or the objective lens | 2550 mm |
| Incident angle of the first grating | 66° < 66.36385° |
| Diameter of the incident light onto the first grating and the second grating | Ø30 mm |
| Density of the grating groove of the first grating and the second grating | 1740 g/mm |
| Fluence of the grating working of the first grating and the second grating | 0.5 J/cm$^2$ |
| Size of the first grating 3 | 100 mm × 50 mm × 20 mm |
| Size of the second grating 3' | 100 mm × 50 mm × 20 mm |
| Size of the first concave reflector 1 | Ø30 mm × 40 mm, R0.6 m* |
| Size of the second concave reflector 2 | Ø292 mm × 40 mm, R6 m* |
| Size of the third concave reflector 4 | Ø292 mm × 40 mm, R6 m* |
| Size of the fourth concave reflector 4' | Ø292 mm × 40 mm, R6 m* |
| Size of the fifth concave reflector 2' | Ø292 mm × 40 mm, R6 m* |
| Size of the sixth concave reflector 1' | Ø30 mm × 40 mm, R0.6 m* |
| Size of the planar reflector for spectrum shaping function design 5 | 440 mm × 100 mm × 40 mm |

TABLE 1-continued the parameters of the design requirement and the optical element

| Item | Parameters |
|---|---|
| Bandwidth of the non-apodized spectra of the planar reflector for spectrum shaping design 5 | 24 nm |
| Diameter of the first aperture 6 | 256.93 μm |
| Diameter of the third aperture 6' | 270.89 μm |

Note:
*(radius of curvature)

In this example 1, the spatial arrangement of a spectra shaping apparatus is: all the concave reflectors, the dispersion components, and the aperture in the spectrum decomposing system and those in the spectrum synthesizing system, and all their images are in a horizontal planar. That is to say, the spatial arrangement of a spectra shaping apparatus is a spectrum shaping apparatus constructed as a reflective-type horizontal imaging construction for the spectroscope system. FIG. 1 schematically illustrates the structure of a spectra shaping apparatus, which the above elements are settled in this optical path construction. The parameters of the spatial arrangement is shown in table 2, which are:

TABLE 2 the parameters of the spatial arrangement

| Item | Parameters |
|---|---|
| Angle ∠012 between the axis and the centre line of the first concave reflector 1 off-axis settled | 8° |
| Angle ∠123 between the axis and the centre line of the second concave reflector 2 off-axis settled | 8° |
| Angle ∠234 between the incident light and the diffraction light on the first grating 3 | 132.7° |
| Angle ∠345 between the axis and the centre line of the third concave reflector 4 off-axis settled | 8.7335° |
| Angle ∠454' between the incident light and the diffraction light on the planar reflector for spectrum shaping design 5 | 6° |
| Angle ∠54'3' between the axis and the centre line of the fourth concave reflector 4' off-axis settled | 8.7335° |
| Angle ∠4'3'2' between the incident light and the diffraction light on the second grating 3' | 132.7° |
| Angle ∠3'2'1' between the axis and the centre line of the fifth concave reflector 2' off-axis settled | 8° |
| Angle ∠2'1'0' between the axis and the centre line of the sixth concave reflector 1' off-axis settled | 8° |

The spectra shaping apparatus decomposing system: describing in the optical path order, a laser beam from the 0 passes through the 1 and the 2, which constitute the image transfer 50 construction. Then it focuses onto the 6. Here the 6 becomes the incident aperture of the spectrum shaping structure in example 1. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the Spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Figure 3:
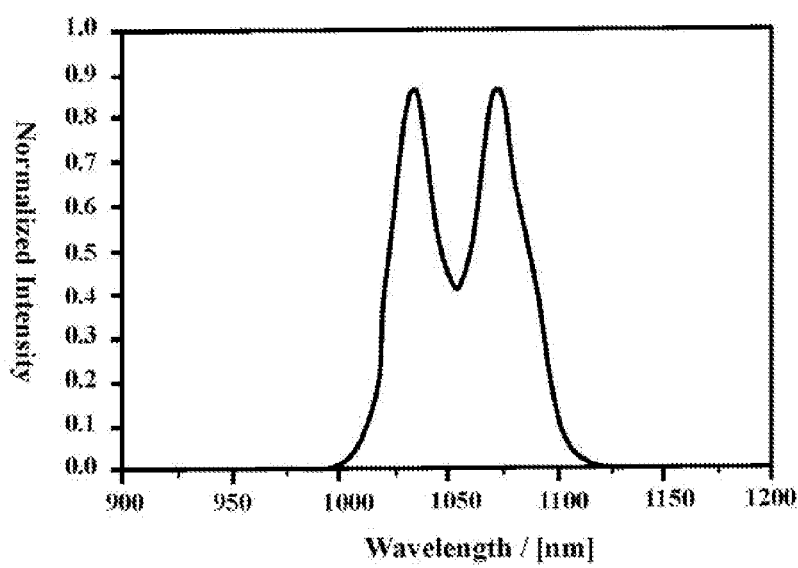
FIG. 3 is a graph schematically illustrating the shaped pulse waveform of spectrum after modulation by the present invention spectra shaping apparatus.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 1, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 1 is a realization of the spectrum shaping apparatus for chirped pulse amplification, which accomplishes the modulation and the shaping of the spectrum making it to a designed shape.

Example 2 of the Apparatus

In this example 2, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system and those in the spectrum synthesizing system, and all their images are in a vertical planar. That is to say, the spatial arrangement of a spectra shaping apparatus is a spectrum shaping apparatus constructed as a reflective-type vertical imaging construction for the spectroscope system. FIG. 1 schematically illustrates the structure of a spectra shaping apparatus, which the above elements are settled in this optical path construction. The parameters of the spatial arrangement is shown in table 3, which are:

TABLE 3

| the parameters of the spatial arrangement | |
|---|---|
| Item | Parameters |
| Angle ∠012 between the axis and the centre line of the first concave reflector 1 off-axis settled projecting on the horizontal | 8° |
| Angle ∠012 between the axis and the centre line of the first concave reflector 1 off-axis settled projecting on the vertical | 6° |
| Angle ∠123 between the axis and the centre line of the second concave reflector 2 off-axis settled projecting on the horizontal | 8° |
| Angle ∠123 between the axis and the centre line of the second concave reflector 2 off-axis settled projecting on the vertical | 6° |
| Angle ∠234 between the incident light and the diffraction light on the first grating 3 projecting on the horizontal | 0.733° |
| Angle ∠234 between the incident light and the diffraction light on the first grating 3 projecting on the vertical | 6° |
| Angle ∠345 between the axis and the centre line of the third concave reflector 4 off-axis settled projecting on the horizontal | 8.7335° |
| Angle ∠345 between the axis and the centre line of the third concave reflector 4 off-axis settled projecting on the vertical | 6° |
| Angle ∠454' between the incident light and the diffraction light on the planar reflector for spectrum shaping design 5 projecting on the horizontal | 0° |
| Angle ∠454' between the incident light and the diffraction light on the planar reflector for spectrum shaping design 5 projecting on the vertical | 6° |
| Angle ∠54'3' between the axis and the centre line of the fourth concave reflector 4' off-axis settled projecting on the horizontal | 8.7335° |
| Angle ∠54'3' between the axis and the centre line of the fourth concave reflector 4' off-axis settled projecting on the vertical | 6° |
| Angle ∠4'3'2' between the incident light and the diffraction light on the second grating 3' projecting on the horizontal | 0.733° |
| Angle ∠4'3'2' between the incident light and the diffraction light on the second grating 3' projecting on the vertical | 6° |
| Angle ∠3'2'1' between the axis and the centre line of the fifth concave reflector 2' off-axis settled projecting on the horizontal | 8° |
| Angle ∠3'2'1' between the axis and the centre line of the fifth concave reflector 2' off-axis settled projecting on the vertical | 6° |
| Angle ∠2'1'0' between the axis and the centre line of the sixth concave reflector 1' off-axis settled projecting on the horizontal | 8° |
| Angle ∠2'1'0' between the axis and the centre line of the sixth concave reflector 1' off-axis settled projecting on the vertical | 6° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 2. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant.

Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 2, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 2 is a realization of the spectrum shaping apparatus for chirped pulse amplification, which accomplishes the modulation and the shaping of the spectrum making it to a designed shape.

Example 3 of the Apparatus

In this example 3, all the optical element are selected that the parameters of the design requirement and the optical elements are the same as that shown in table 1 in example 1. In present invent of apparatus, the spatial arrangement of a spectra shaping apparatus is: all the concave reflectors, the dispersion components, and the aperture in the spectrum decomposing system and those in the spectrum synthesizing system, and all their images are in a horizontal planar. That is to say, the spatial arrangement of a self-collimation CTSI spectrum plane shaping system is a spectrum shaping apparatus constructed as a reflective-type horizontal imaging construction for the spectroscope system, which constructed as vertical symmetric relative to the planar reflector for spectrum shaping function design. FIG. 1 schematically illustrates the structure of a spectra shaping apparatus, which the above elements are settled in this optical path construction. The parameters of the spatial arrangement is shown in table 4, which are:

TABLE 4 the parameters of the spatial arrangement

| Item | Parameters |
|---|---|
| Angle ∠012 between the axis and the centre line of the first concave reflector 1 off-axis settled | 8° |
| Angle ∠123 between the axis and the centre line of the second concave reflector 2 off-axis settled | 8° |
| Angle ∠234 between the incident light and the diffraction light on the first grating 3 | 132.7° |

TABLE 4-continued the parameters of the spatial arrangement

| Item | Parameters |
|---|---|
| Angle ∠345 between the axis and the centre line of the third concave reflector 4 off-axis settled | 8.7335° |
| Angle ∠454' between the incident light and the diffraction light on the planar reflector for spectrum shaping design 5 | 6° |
| Angle ∠54'3' between the axis and the centre line of the fourth concave reflector 4' off-axis settled | 8.7335° |
| Angle ∠4'3'2' between the incident light and the diffraction light on the second grating 3' | 132.7° |
| Angle ∠3'2'1' between the axis and the centre line of the fifth concave reflector 2' off-axis settled | 8° |
| Angle ∠2'1'0' between the axis and the centre line of the sixth concave reflector 1' off-axis settled | 8° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 3. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates this symmetrical CTSI spectrum shaping system making a depression in the centre wavelength of 1053 nm, and the spectrum modulation ratio can be controlled over 60% under the condition that the phase of the reflecting light remains nearly constant.

In the example 3, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 3 is a realization of the spectrum shaping apparatus for chirped pulse amplification, which accomplishes the modulation and the shaping of the spectrum making it to a designed shape.

Example 4 of the Apparatus

In this example 4, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system and those in the spectrum synthesizing system, and all their images are in a vertical planar, that is to say, the spatial arrangement of a spectra shaping apparatus is a spectrum shaping apparatus constructed as a reflective-type vertical imaging construction for the spectroscope system, which constructed as horizontal symmetric relative to the planar reflector for spectrum shaping function design. FIG. 1 schematically illustrates the structure of a spectra shaping apparatus, which the above elements are settled in this optical path construction. The parameters of the spatial arrangement is shown in table 5, which are:

TABLE 5 the parameters of the spatial arrangement

| Item | Parameters |
|---|---|
| Angle ∠012 between the axis and the centre line of the first concave reflector 1 off-axis settled projecting on the horizontal | 8° |
| Angle ∠012 between the axis and the centre line of the first concave reflector 1 off-axis settled projecting on the vertical | 6° |

TABLE 5-continued the parameters of the spatial arrangement

| Item | Parameters |
|---|---|
| Angle ∠123 between the axis and the centre line of the second concave reflector 2 off-axis settled projecting on the horizontal | 8° |
| Angle ∠123 between the axis and the centre line of the second concave reflector 2 off-axis settled projecting on the vertical | 6° |
| Angle ∠234 between the incident light and the diffraction light on the first grating 3 projecting on the horizontal | 0.733° |
| Angle ∠234 between the incident light and the diffraction light on the first grating 3 projecting on the vertical | 6° |
| Angle ∠345 between the axis and the centre line of the third concave reflector 4 off-axis settled projecting on the horizontal | 8.7335° |
| Angle ∠345 between the axis and the centre line of the third concave reflector 4 off-axis settled projecting on the vertical | 6° |
| Angle ∠454' between the incident light and the diffraction light on the planar reflector for spectrum shaping design 5 projecting on the horizontal | 6° |
| Angle ∠454' between the incident light and the diffraction light on the planar reflector for spectrum shaping design 5 projecting on the vertical | 0° |
| Angle ∠54'3' between the axis and the centre line of the fourth concave reflector 4' off-axis settled projecting on the horizontal | 8.7335° |
| Angle ∠54'3' between the axis and the centre line of the fourth concave reflector 4' off-axis settled projecting on the vertical | 6° |
| Angle ∠4'3'2' between the incident light and the diffraction light on the second grating 3' projecting on the horizontal | 0.733° |
| Angle ∠4'3'2' between the incident light and the diffraction light on the second grating 3' projecting on the vertical | 6° |
| Angle ∠3'2'1' between the axis and the centre line of the fifth concave reflector 2' off-axis settled projecting on the horizontal | 8° |
| Angle ∠3'2'1' between the axis and the centre line of the fifth concave reflector 2' off-axis settled projecting on the vertical | 6° |
| Angle ∠2'1'0' between the axis and the centre line of the sixth concave reflector 1' off-axis settled projecting on the horizontal | 8° |
| Angle ∠2'1'0' between the axis and the centre line of the sixth concave reflector 1' off-axis settled projecting on the vertical | 6° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 4. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 4, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 4 is a realization of the spectrum shaping apparatus for chirped pulse amplification, which accomplishes the modulation and the shaping of the spectrum making it to a designed shape.

Example 5 of the Apparatus

In this example 5, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system, and all their images are in a horizontal planar. However, all the concave reflectors, the dispersion components, and the aperture in the spectrum synthesizing system, and all their images are in a vertical planar, in addition, the spectrum decomposing system and the spectrum synthesizing system are constructed as vertical symmetric relative to the planar reflector for spectrum shaping function design. FIG. 1 schematically illustrates the structure of a spectra shaping apparatus, which the above elements are settled in this optical path construction. The parameters of the spatial arrangement is shown in Table 6, which are:

TABLE 6 the parameters of the spatial arrangement

| Item | Parameters |
|---|---|
| Angle ∠012 between the axis and the centre line of the first concave reflector 1 off-axis settled | 8° |
| Angle ∠123 between the axis and the centre line of the second concave reflector 2 off-axis settled | 8° |
| Angle ∠234 between the incident light and the diffraction light on the first grating 3 | 132.7° |
| Angle ∠345 between the axis and the centre line of the third concave reflector 4 off-axis settled | 8.7335° |
| Angle ∠454' between the incident light and the diffraction light on the planar reflector for spectrum shaping design 5 projecting on the horizontal | 0° |
| Angle ∠454' between the incident light and the diffraction light on the planar reflector for spectrum shaping design 5 projecting on the vertical | 6° |
| Angle ∠54'3' between the axis and the centre line of the fourth concave reflector 4' off-axis settled projecting on the horizontal | 8.7335° |
| Angle ∠54'3' between the axis and the centre line of the fourth concave reflector 4' off-axis settled projecting on the vertical | 6° |
| Angle ∠4'3'2' between the incident light and the diffraction light on the second grating 3' projecting on the horizontal | 0.733° |
| Angle ∠4'3'2' between the incident light and the diffraction light on the second grating 3' projecting on the vertical | 6° |
| Angle ∠3'2'1' between the axis and the centre line of the fifth concave reflector 2' off-axis settled projecting on the horizontal | 8° |
| Angle ∠3'2'1' between the axis and the centre line of the fifth concave reflector 2' off-axis settled projecting on the vertical | 6° |
| Angle ∠2'1'0' between the axis and the centre line of the sixth concave reflector 1' off-axis settled projecting on the horizontal | 8° |
| Angle ∠2'1'0' between the axis and the centre line of the sixth concave reflector 1' off-axis settled projecting on the vertical | 6° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 5. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant.

Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 5, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 5 is a realization of the spectrum shaping apparatus for chirped pulse amplification, which accomplishes the modulation and the shaping of the spectrum making it to a designed shape.

Example 6 of the Apparatus

In this example 6, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system, and all their images are in a vertical planar. However, all the concave reflectors, the dispersion components, and the aperture in the spectrum synthesizing system, and all their images are in a horizontal planar, in addition, the spectrum decomposing system and the spectrum synthesizing system are constructed as vertical symmetric relative to the planar reflector for spectrum shaping function design. FIG. 1 schematically illustrates the structure of a spectra shaping apparatus, which the above elements are settled in this optical path construction. The parameters of the spatial arrangement is shown in Table 7, which are:

TABLE 7 the parameters of the spatial arrangement

| Item | Parameters |
| --- | --- |
| Angle ∠012 between the axis and the centre line of the first concave reflector 1 off-axis settled projecting on the horizontal | 8° |
| Angle ∠012 between the axis and the centre line of the first concave reflector 1 off-axis settled projecting on the vertical | 6° |
| Angle ∠123 between the axis and the centre line of the second concave reflector 2 off-axis settled projecting on the horizontal | 8° |
| Angle ∠123 between the axis and the centre line of the second concave reflector 2 off-axis settled projecting on the vertical | 6° |
| Angle ∠234 between the incident light and the diffraction light on the first grating 3 projecting on the horizontal | 0.733° |
| Angle ∠234 between the incident light and the diffraction light on the first grating 3 projecting on the vertical | 6° |
| Angle ∠345 between the axis and the centre line of the third concave reflector 4 off-axis settled projecting on the horizontal | 8.7335° |
| Angle ∠345 between the axis and the centre line of the third concave reflector 4 off-axis settled projecting on the vertical | 6° |
| Angle ∠454' between the incident light and the diffraction light on the planar reflector for spectrum shaping design 5 projecting on the horizontal | 0° |
| Angle ∠454' between the incident light and the diffraction light on the planar reflector for spectrum shaping design 5 projecting on the vertical | 6° |
| Angle ∠54'3' between the axis and the centre line of the fourth concave reflector 4' off-axis settled | 8.7335° |

TABLE 7-continued the parameters of the spatial arrangement

| Item | Parameters |
|---|---|
| Angle ∠4'3'2' between the incident light and the diffraction light on the second grating 3' | 132.7° |
| Angle ∠3'2'1' between the axis and the centre line of the fifth concave reflector 2' off-axis settled | 8° |
| Angle ∠2'1'0' between the axis and the centre line of the sixth concave reflector 1' off-axis settled | 8° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 6. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 6, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 6 is a realization of the spectrum shaping apparatus for chirped pulse amplification, which accomplishes the modulation and the shaping of the spectrum making it to a designed shape.

Example 7 of the Apparatus

In this example 7, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system, and all their images are in a horizontal planar, however, all the concave reflectors, the dispersion components, and the aperture in the spectrum synthesizing system, and all their images are in a vertical planar, in addition, the spectrum decomposing system and the spectrum synthesizing system are constructed as horizontal symmetric relative to the planar reflector for spectrum shaping function design. FIG. 1 schematically illustrates the structure of a spectra shaping apparatus, which the above elements are settled in this optical path construction. The parameters of the spatial arrangement is shown in Table 8, which are:

TABLE 8 the parameters of the spatial arrangement

| Item | Parameters |
|---|---|
| Angle ∠012 between the axis and the centre line of the first concave reflector 1 off-axis settled | 8° |
| Angle ∠123 between the axis and the centre line of the second concave reflector 2 off-axis settled | 8° |
| Angle ∠234 between the incident light and the diffraction light on the first grating 3 | 132.7° |
| Angle ∠345 between the axis and the centre line of the third concave reflector 4 off-axis settled | 8.7335° |

TABLE 8-continued the parameters of the spatial arrangement

| Item | Parameters |
|---|---|
| Angle ∠454' between the incident light and the diffraction light on the planar reflector for spectrum shaping design 5 | 6° |
| Angle ∠54'3' between the axis and the centre line of the fourth concave reflector 4' off-axis settled projecting on the horizontal | 8.7335° |
| Angle ∠54'3' between the axis and the centre line of the fourth concave reflector 4' off-axis settled projecting on the vertical | 6° |
| Angle ∠4'3'2' between the incident light and the diffraction light on the second grating 3' projecting on the horizontal | 0.733° |
| Angle ∠4'3'2' between the incident light and the diffraction light on the second grating 3' projecting on the vertical | 6° |
| Angle ∠3'2'1' between the axis and the centre line of the fifth concave reflector 2' off-axis settled projecting on the horizontal | 8° |
| Angle ∠3'2'1' between the axis and the centre line of the fifth concave reflector 2' off-axis settled projecting on the vertical | 6° |
| Angle ∠2'1'0' between the axis and the centre line of the sixth concave reflector 1' off-axis settled projecting on the horizontal | 8° |
| Angle ∠2'1'0' between the axis and the centre line of the sixth concave reflector 1' off-axis settled projecting on the vertical | 6° |

The spectra shaping apparatus decomposing system: describing m the optical path order, a laser beam from the 0 passes through the 1 and the 2, which constitute the image transfer construction. Then it focuses onto the 6. Here the 6 becomes the incident aperture of the spectrum shaping structure in example 7. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 7, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 7 is a realization of the spectrum shaping apparatus for chirped pulse amplification, which accomplishes the modulation and the shaping of the spectrum making it to a designed shape.

Example 8 of the Apparatus

In this example 8, all the optical element are selected that the parameters of the design requirement and the optical elements are the same as that shown in table 1 in example 1. The spatial arrangement of this spectra shaping apparatus is: all the concave reflectors, the dispersion components, and the aperture in the spectrum decomposing system, and all their images are in a vertical planar, however, all the concave reflectors, the dispersion components, and the aperture in the spectrum synthesizing system, and all their images are in a horizontal planar, in addition, the spectrum decomposing system and the spectrum synthesizing system are constructed as horizontal symmetric relative to the planar reflector for spectrum shaping function design. FIG. 1 schematically illustrates the structure of a spectra shaping apparatus, which the above elements are settled in this optical path construction. The parameters of the spatial arrangement is shown in Table 9, which are:

TABLE 9 the parameters of the spatial arrangement

| Item | Parameters |
|---|---|
| Angle ∠012 between the axis and the centre line of the first concave reflector 1 off-axis settled projecting on the horizontal | 8° |
| Angle ∠012 between the axis and the centre line of the first concave reflector 1 off-axis settled projecting on the vertical | 6° |
| Angle ∠123 between the axis and the centre line of the second concave reflector 2 off-axis settled projecting on the horizontal | 8° |
| Angle ∠123 between the axis and the centre line of the second concave reflector 2 off-axis settled projecting on the vertical | 6° |
| Angle ∠234 between the incident light and the diffraction light on the first grating 3 projecting on the horizontal | 0.733° |
| Angle ∠234 between the incident light and the diffraction light on the first grating 3 projecting on the vertical | 6° |
| Angle ∠345 between the axis and the centre line of the third concave reflector 4 off-axis settled projecting on the horizontal | 8.7335° |
| Angle ∠345 between the axis and the centre line of the third concave reflector 4 off-axis settled projecting on the vertical | 6° |
| Angle ∠454' between the incident light and the diffraction light on the planar reflector for spectrum shaping design 5 | 6° |
| Angle ∠54'3' between the axis and the centre line of the fourth concave reflector 4' off-axis settled | 8.7335° |
| Angle ∠4'3'2' between the incident light and the diffraction light on the second grating 3' | 132.7° |
| Angle ∠3'2'1' between the axis and the centre line of the fifth concave reflector 2' off-axis settled | 8° |
| Angle ∠2'1'0' between the axis and the centre line of the sixth concave reflector 1' off-axis settled | 8° |

The spectra shaping apparatus decomposing system: describing in the optical path order, a laser beam from the 0 passes through the 1 and the 2, which constitute the image transfer construction. Then it focuses onto the 6. Here the 6 becomes the incident aperture of the spectrum shaping structure in example 8. The laser beam passes through the 2, where it is transformed into a parallel light, then it is projected onto the 3, which constitutes the collimation system. However, because of the laser illumination, the 6 substitutes the slit diaphragm in general CTSI system, and serves as the real light source for the following system, which limits the beam of an incident light entering into the structure of a symmetric CTSI spectrum shaping system. The laser beam from the 6 passes through the 2, where it is transformed into a parallel light, and then it is projected onto the 3, which comprises the dispersion system. After that, the diffraction light passes through the 4 imaging onto the 10. At this point, all these above constitute the whole spectrum decomposing system, which is denoted by the optical path order 6-2-3-4-5.

The spectrum shaping system: the spectral shaping system is composed of the 10 and the 5. Here, the 5 is featured by a multilayer dielectric thin film as a planar reflector for spectrum shaping with micro-structures in it, which makes the spectrum of chirped pulse a depression in the vicinity of the center wavelength but keeps the phase of the reflecting light nearly constant. Furthermore, the spectrum shaping system requires that the maximal deviation between the spectrum image plane and the planar reflector for spectrum shaping function design is less than the tolerance of the half focal depth deduced from the Rayleigh's Criterion, and requires that the diameter 2dr' of the disc of confusion in the focus plane, or the width a' of the disc of confusion in the direction of the dispersion are less than a certain value $a_0$. The FIG. 2 illustrates that: this planar reflector for spectrum shaping function design can make a depression in the vicinity of the center to shape the reflective intensity into a design spectrum distribution, where curve 1 is the incident chirped pulse spectra, curve 2 is the modulation curve of a multilayer dielectric reflector determined by the microstructure, and curve 3 is the distribution of chirped pulse spectrum after modulation.

The spectra shaping apparatus synthesizing system: that is the symmetrical imaging system and the dispersion system after the 10. This symmetric CTSI spectrum shaping synthesizing system is composed of the 5; and the 4', the 3', the 2', and the 6'. All these above constitute the whole spectrum synthesizing system, which is denoted by the optical path order 5-4'-3'-2'-6'. The features are that: the spectrum synthesizing system 5-4'-3'-2'-6' cancels the dispersion of the spectrum decomposing system 6-2-3-4-5; wherein the dispersion cancelling is that: when tuning the 3 and the 3', the direction of tuning angles should ensure that: from the inversion optical path, tracing the direction of spectral distribution of different wavelength at the 10 in a spectrum synthesizing system with the CTSI construction, the direction should be the same as that of the spectral distribution of the different wavelength at the 10 in a spectrum decomposing system with the CTSI construction in the normal optical path tracing, which makes the optical path difference of the different monochromatic light be zero, and which makes the extra residual dispersion be zero practically.

Finally the chirped pulse passes through the 6' ejecting out after the spectrum decomposing, shaping, and synthesizing processes; then via the 1', it is transformed into a parallel light again, and is sent into the 0' to be amplified. FIG. 3 is a graph schematically illustrating the shaped pulse waveform of spectrum after modulation by the construction in FIG. 1. And FIG. 3 illustrates that this symmetrical CTSI spectrum shaping system make a depression in the centre wavelength of 1053 nm, and the spectrum modulation ratio can be controlled over 60% under the condition that the phase of the reflecting light remains nearly constant.

In the example 8, here the 5 could be substituted by a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating. The example 8 is a realization of the spectrum shaping apparatus for chirped pulse amplification, which accomplishes the modulation and the shaping of the spectrum making it to a designed shape.

The invention claimed is:

1. A spectra shaping apparatus for chirped pulse amplification (CPA):

of which the structure features comprise the followings: in optical path order, a first concave reflector (1); and, a first aperture (6), a second concave reflector (2), a first grating (3), a third concave reflector (4) and a second aperture (10), and these (6)-(2)-(3)-(4)-(10) constitute a spectrum decomposing system for the spectra shaping apparatus; in addition, a second aperture (10) and a planar reflector for spectrum shaping function design (5) that contributes to forming the second aperture, and these (10)-(5) constitute a spectrum shaping system; furthermore, the planar reflector for spectrum shaping function design (5), a fourth concave reflector (4'), a second grating (3'), a fifth concave reflector (2') and a third aperture (6'), and these (5)-(4')-(3')-(2')-(6') constitute a spectrum synthesizing system for the spectra shaping apparatus;

of which the features are: wherein apparatus works on the near or non-Littrow mounting for solving the Grating Wood Abnormality, at the same time ensuring the symmetry of the optical construction;

of which the structure relationship of above systems are the following: where the spectrum synthesizing system is optically symmetrical to the spectrum decomposing system; and where the spectral decomposing system of an improved Czerny-Turner Spectrum Instrument (CTSI) system totally expands a laser chirped pulse to a spectrum image plane, the spectral modulating system performs a spectra modulation on the spectrum image plane, and the CTSI spectral synthesizing system reverts the modulated spectra into the chirped pulse, thereby realizing spectra shaping;

of which the features are: wherein apparatus can be inserted anywhere in the amplifier chain in the CPA system for extracting large energy and reducing the pedestal of the output;

of which the features are: wherein the spectrum modulation can be varied under the condition that the phase of light remains nearly constant;

of which the processing features are the following: in optical path order, a laser beam from a front-end system (0) of a CPA system passes through the first concave reflector (1), the first aperture (6), and the second concave reflector (2), then it is collimated, dispersed, and imaged by the spectrum decomposing system; then it is shaped by the spectrum shaping system; then it is imaged, the dispersion cancelled, and the spectrum synthesized by the spectrum synthesizing system; after that, it passes through the third aperture (6') ejecting out after the spectrum decomposing, the spectrum shaping, and the spectrum synthesizing processes are finished; finally, via a sixth concave reflector (1'), it is transformed into a parallel light again, and it is sent on to the following stage;

of which the features are: wherein the system structure works on not only utilized in the a high energy and ultra-high peak-power laser system in CPA with a large caliber and a chirped pulse bandwidth of a few nanometers, where CPA spectrum shaping makes the solid-state laser driver ejecting a high-energy in addition to a high peak irradiance, but also it can be utilized for a general laser spectrum shaping and spectrum modulation;

of which the features are: wherein the apparatus also can be used as a spectrograph or as a spectroscope system; in addition, it also can be used in a spectroscopy, the spatial distribution shaping, the temporal profile shaping, pulse shaping, and spectra shaping.

2. The spectra shaping apparatus as recited in claim 1, of which the structure features are: wherein the first grating (3) in the spectrum decomposing system, and the second grating (3') in the spectrum synthesizing system are the reflective planar blazed grating, and at the same time they are symmetrically relative to the planar reflector for spectrum shaping function design (5);

wherein the dispersion cancelling or cancelled the dispersion is tuning these two gratings to ensure that: from the inversion optical path, tracing the direction of spectral distribution of different wavelength at the second aperture (10) in a spectrum synthesizing system, it should be the same as the direction of the spectral distribution of the different wavelength at the second aperture (10) in a spectrum decomposing system in the normal optical path tracing.

3. The spectra shaping apparatus as recited in claim 1, of which the structure features are: wherein the all concave reflectors are constructed a symmetrical imaging system relative to the dispersion component, or are constructed an asymmetrical imaging system relative to the dispersion component for compensating the aberration of the image.

4. The spectra shaping apparatus as recited in claim 1, of which the structure features are: wherein the concave reflectors are made with the chromatic aberration, the spherical aberration, the comatic aberration, the astigmatism and the field curvature eliminated strictly in the whole working frequency bandwidth, to ensure the maximized deviation between the spectrum image plane and the planar reflector for spectrum shaping function design less than the tolerance of the half focal depth.

5. The spectra shaping apparatus as recited in claim 1, of which the structure features are: wherein the exit pupil of the spectrum decomposing system must coincide with the entrance pupil of the spectrum synthesizing system; or the beam-out from the centre of the first dispersion element or the first grating (3) must pass through the centre of the second dispersion element or the second grating (3').

6. The spectra shaping apparatus as recited in claim 1, of which the structure features are: wherein the first aperture (6), and the third aperture (6') are the aperture diaphragm in the real con-focal telescope, which constructed as an illumination system and as an image transfer construction;

wherein the illumination system consists of the first concave reflector (1), the first aperture (6) and the second concave reflector (2), or consists of the sixth concave reflector (1'), the third aperture (6') and the fifth concave reflector (2'), which it ensures that the normal width is suitable for the coherence and phase consisted conditions for a incident light, the distribution of the laser beam obtained from the front-end system of a CPA system do not changed in the spatial and temporal domain, the relative aperture in the illumination system must matched with the relative apertures in the dispersion system and in the imaging system, and the clear aperture can fill the caliber of the dispersion element;

wherein the second aperture (10) is a slit diaphragm that composed of a light barrier and its image in the planar reflector for spectrum shaping function design (5), and all aperture must satisfy the normal width $a_0$ condition for a diaphragm, at the same time the second aperture (10) and the third aperture (6') can pass through the light with all the frequency components within the chirped laser pulse bandwidth.

7. The spectra shaping apparatus as recited in claim 1, of which the structure features are: wherein the spectrum decomposing system and the spectrum synthesizing system must ensure that, in both system, the focal length of the collimation system and the focal length of the imaging system are equal, and also the lateral magnifications are equal; or the construction of the spectrum decomposing system and the spectrum synthesizing system are absolutely symmetrical, furthermore, tracing in the inversion optical path direction, the focal length of the collimation system and the focal length of the imaging system are equal, and also the lateral magnifications are equal.

8. The spectra shaping apparatus as recited in claim 1, of which the structure features are: wherein all the concave reflectors in the spectrum decomposing system and all the concave reflectors in the spectrum synthesizing system are constructed as a reflective-type horizontal imaging system relative to the dispersion component for the spectroscope system, or are constructed as a reflective-type vertical imaging system relative to the dispersion component for the spectroscope system.

9. The spectra shaping apparatus as recited in claim 1, of which the structure features are: wherein the spectrum decomposing system and the spectrum synthesizing system are constructed as a reflective-type horizontal imaging and shaping system relative to the planar reflector for spectrum shaping function design (5) for the spectroscope system, or are constructed as a reflective-type vertical imaging and shaping system relative to the planar reflector for spectrum shaping function design (5) for the spectroscope system.

10. The spectra shaping apparatus as recited in claim 1, of which the structure features are: wherein the a planar reflector for spectrum shaping function design could be a multilayer dielectric thin film as a reflector for spectrum shaping with micro-structures in it, or a reflector for spectrum shaping with micro-mirrors structures in it, or a liquid crystal light valve, or a reflector for spectrum shaping with a varied line space grating in front of it, or a reflector for spectrum shaping with a liquid crystal spatial light modulator in front of it, or a reflector for spectrum shaping with micro-electromechanical mirrors, or a continuous deformation reflector for spectrum shaping, or a bimorph deformation reflector for spectrum shaping, or a reflector for spectrum shaping with a prism/waveguide coupling, or a reflector for spectrum shaping with a varied line space grating.

* * * * *